United States Patent
Wang et al.

(10) Patent No.: US 8,181,003 B2
(45) Date of Patent: May 15, 2012

(54) INSTRUCTION SET DESIGN, CONTROL AND COMMUNICATION IN PROGRAMMABLE MICROPROCESSOR CORES AND THE LIKE

(75) Inventors: Xiaolin Wang, Concord, MA (US);
Qian Wu, San Jose, CA (US); Benjamin Marshall, Stow, MA (US); Fugui Wang, Sterling, MA (US); Gregory Pitarys, Stow, MA (US); Ke Ning, Framingham, MA (US)

(73) Assignee: Axis Semiconductor, Inc., Boxborough, MA (US)

( * ) Notice: Subject to any disclaimer, the term of this patent is extended or adjusted under 35 U.S.C. 154(b) by 905 days.

(21) Appl. No.: 12/156,007

(22) Filed: May 29, 2008

(65) Prior Publication Data

US 2009/0300337 A1    Dec. 3, 2009

(51) Int. Cl.
*G06F 9/30* (2006.01)
(52) U.S. Cl. ............... 712/225; 712/11; 712/220
(58) Field of Classification Search ........ 712/11, 712/220, 221, 223, 225
See application file for complete search history.

(56) References Cited

U.S. PATENT DOCUMENTS

| | | | | |
|---|---|---|---|---|
| 5,212,777 A * | 5/1993 | Gove et al. | ............. | 712/229 |
| 5,226,125 A * | 7/1993 | Balmer et al. | ............. | 710/317 |
| 5,239,654 A * | 8/1993 | Ing-Simmons et al. | ........ | 712/20 |
| 5,471,592 A * | 11/1995 | Gove et al. | ............. | 709/213 |
| 5,471,626 A * | 11/1995 | Carnevale et al. | ............. | 712/219 |
| 5,594,679 A * | 1/1997 | Iwata | ............. | 708/521 |
| 5,706,459 A | 1/1998 | Atsushi | | |
| 5,784,636 A | 7/1998 | Rupp | | |
| 5,887,160 A | 3/1999 | Lauritzen et al. | | |
| 5,937,203 A | 8/1999 | Lee et al. | | |
| 5,996,083 A * | 11/1999 | Gupta et al. | ............. | 713/322 |
| 6,023,753 A * | 2/2000 | Pechanek et al. | ............. | 712/18 |
| 6,052,773 A | 4/2000 | DeHon et al. | | |
| 6,070,003 A * | 5/2000 | Gove et al. | ............. | 710/317 |
| 6,151,668 A * | 11/2000 | Pechanek et al. | ............. | 712/24 |
| 6,173,389 B1 * | 1/2001 | Pechanek et al. | ............. | 712/24 |
| 6,216,223 B1 * | 4/2001 | Revilla et al. | ............. | 712/245 |

(Continued)

FOREIGN PATENT DOCUMENTS

EP    0284364 A    9/1988

(Continued)

OTHER PUBLICATIONS

Michael Taylor et al., The Raw Processor: A Composeable 32-Bit Fabric for Embedded and General Purpose Computing, MIT Laboratory for Computer Science, Proceedings of Hotchips Aug. 13, 2001, 4 pages.

(Continued)

*Primary Examiner* — Aimee Li
(74) *Attorney, Agent, or Firm* — Maines Cernota & Rardin

(57) ABSTRACT

Improved instruction set and core design, control and communication for programmable microprocessors is disclosed, involving the strategy for replacing centralized program sequencing in present-day and prior art processors with a novel distributed program sequencing wherein each functional unit has its own instruction fetch and decode block, and each functional unit has its own local memory for program storage; and wherein computational hardware execution units and memory units are flexibly pipelined as programmable embedded processors with reconfigurable pipeline stages of different order in response to varying application instruction sequences that establish different configurations and switching interconnections of the hardware units.

39 Claims, 9 Drawing Sheets

U.S. PATENT DOCUMENTS

| | | | |
|---|---|---|---|
| 6,219,785 B1 | 4/2001 | Smith | |
| 6,321,322 B1* | 11/2001 | Pechanek et al. | 712/24 |
| 6,446,191 B1* | 9/2002 | Pechanek et al. | 712/24 |
| 6,467,036 B1* | 10/2002 | Pechanek et al. | 712/24 |
| 6,539,438 B1 | 3/2003 | Ledzius et al. | |
| 6,574,764 B2 | 6/2003 | Krech, Jr. et al. | |
| 6,704,857 B2* | 3/2004 | Barry et al. | 712/215 |
| 6,851,041 B2* | 2/2005 | Pechanek et al. | 712/24 |
| 6,859,873 B2 | 2/2005 | Norden et al. | |
| 6,883,088 B1* | 4/2005 | Barry et al. | 712/215 |
| 6,954,281 B2* | 10/2005 | Fukuda et al. | 358/1.16 |
| 7,036,036 B2 | 4/2006 | Vorbach et al. | |
| 7,143,302 B2* | 11/2006 | Pappalardo et al. | 713/500 |
| 7,200,287 B2* | 4/2007 | Fukuda et al. | 382/304 |
| 7,205,864 B2 | 4/2007 | Schultz, Jr. et al. | |
| 7,260,707 B2 | 8/2007 | Norden et al. | |
| 7,395,411 B2 | 7/2008 | Kasahara | |
| 7,406,588 B2 | 7/2008 | Lin et al. | |
| 7,454,598 B2 | 11/2008 | Hastie | |
| 7,519,797 B1* | 4/2009 | Stiehl et al. | 712/227 |
| 7,653,805 B2* | 1/2010 | Yoshikawa et al. | 712/37 |
| RE41,703 E* | 9/2010 | Pechanek et al. | 712/24 |
| 2001/0012127 A1* | 8/2001 | Fukuda et al. | 358/444 |
| 2001/0021278 A1* | 9/2001 | Fukuda et al. | 382/302 |
| 2002/0162046 A1 | 10/2002 | Krech, Jr. | |
| 2002/0199085 A1 | 12/2002 | Norden | |
| 2003/0043848 A1* | 3/2003 | Sonksen | 370/474 |
| 2003/0061473 A1* | 3/2003 | Revilla et al. | 712/245 |
| 2003/0079109 A1* | 4/2003 | Pechanek et al. | 712/24 |
| 2003/0088757 A1 | 5/2003 | Lindner et al. | |
| 2003/0200420 A1* | 10/2003 | Pechanek et al. | 712/209 |
| 2004/0019765 A1 | 1/2004 | Klein, Jr. | |
| 2004/0078548 A1 | 4/2004 | Claydon | |
| 2005/0021578 A1 | 1/2005 | Chen | |
| 2005/0076187 A1 | 4/2005 | Claydon | |
| 2005/0149699 A1 | 7/2005 | Norden | |
| 2006/0028683 A1* | 2/2006 | Fukuda et al. | 358/1.16 |
| 2006/0253689 A1 | 11/2006 | Knowles | |
| 2006/0259741 A1 | 11/2006 | Hastie | |
| 2006/0259742 A1 | 11/2006 | Norden et al. | |
| 2006/0259748 A1 | 11/2006 | Lin | |
| 2007/0143577 A1 | 6/2007 | Smith | |
| 2008/0301413 A1 | 12/2008 | Wang | |

FOREIGN PATENT DOCUMENTS

| | | |
|---|---|---|
| EP | 0569312 A2 | 11/1993 |
| EP | 1199629 A1 | 4/2002 |
| EP | 1780644 A1 | 5/2007 |
| WO | 9744728 | 11/1997 |
| WO | 2003088071 A2 | 10/2003 |

OTHER PUBLICATIONS

PCT Search Report for PCT Application No. PCT/IB2009/000131, Jun. 23, 2009, 4 pages.

Barat F et al, Reconfigurable instructin set processors from a hardware/software perspective, IEEE Transactions on Software Engineering, IEE Service Center, vol. 28, No. 9, Sep. 1, 2002, 16 pages.

Chen D C et al, A Reconfigurable Multiprocessor IC for Rapid Prototyping of Algorithmic-Specfiic High-Sped DSP Data Paths, IEEE Journal of Soldid-State Circuits, IEE Service Center, vol. 27, No. 12, Dec. 1, 1992, 10 pages.

Hans M Jacobson et al, Application-Specific Programmable Control for High-Performance Asynchronous Circuits, Proceedings of the IEEE, IEEE. NY, NY vol. 87, No. 2, Feb. 1, 1999, 13 pages.

PCT Search Report dated Aug. 25, 2010 of Patent Application No. PCT/IB2009/000135 filed Jan. 26, 2009.

Anirban Baso: "A Transputer Based Adaptable Pipeline" Internationl Conference on Supercomputing, Conferenceproceedings. ACM, New York, US vol. 1, May 4, 1987.

Schmit H H et al: "Pipeline Reconfigurable FPGAS" Journal of VLSI Signal Processing Systems for Signal, Image, and Video Technology, Springer, New York, NY US LNKD-DOI: 10.1023/A: 1008137204598, vol. 24, No. 2/03, Mar. 1, 2000, pp. 12-145, XP000908461 ISSN:0922-5773 the whole document.

USPTO Non-Final Office Action for U.S. Appl. No. 12/156,006, dated Nov. 17, 2010, 6 pages.

USPTO Non-Final Office Action for U.S. Appl. No. 11/973,184, dated May 28, 2010, 16 pages.

USPTO Final Office Action for U.S. Appl. No. 11/973,184, dated Jan. 5, 2011, 17 pages.

USPTO Final Office Action for U.S. Appl. No. 12/156,006, dated Feb. 17, 2011, 7 pages.

European Examination Report for Appl. No. 09754166.8, dated Aug. 19, 2011, 5 pgs.

European Examination Report for Appl. No. 09754167.6, dated Aug. 25, 2011, 5 pgs.

PCT Search Report for PCT Application No. PCT/IB2009/000135, Aug. 25, 2010, 9 pages.

* cited by examiner

Figure 2: Sequencer for Functional Unit

Figure 3: Control Organization

Figure 4: Supplier-Consumer Organization for Data Pipeline

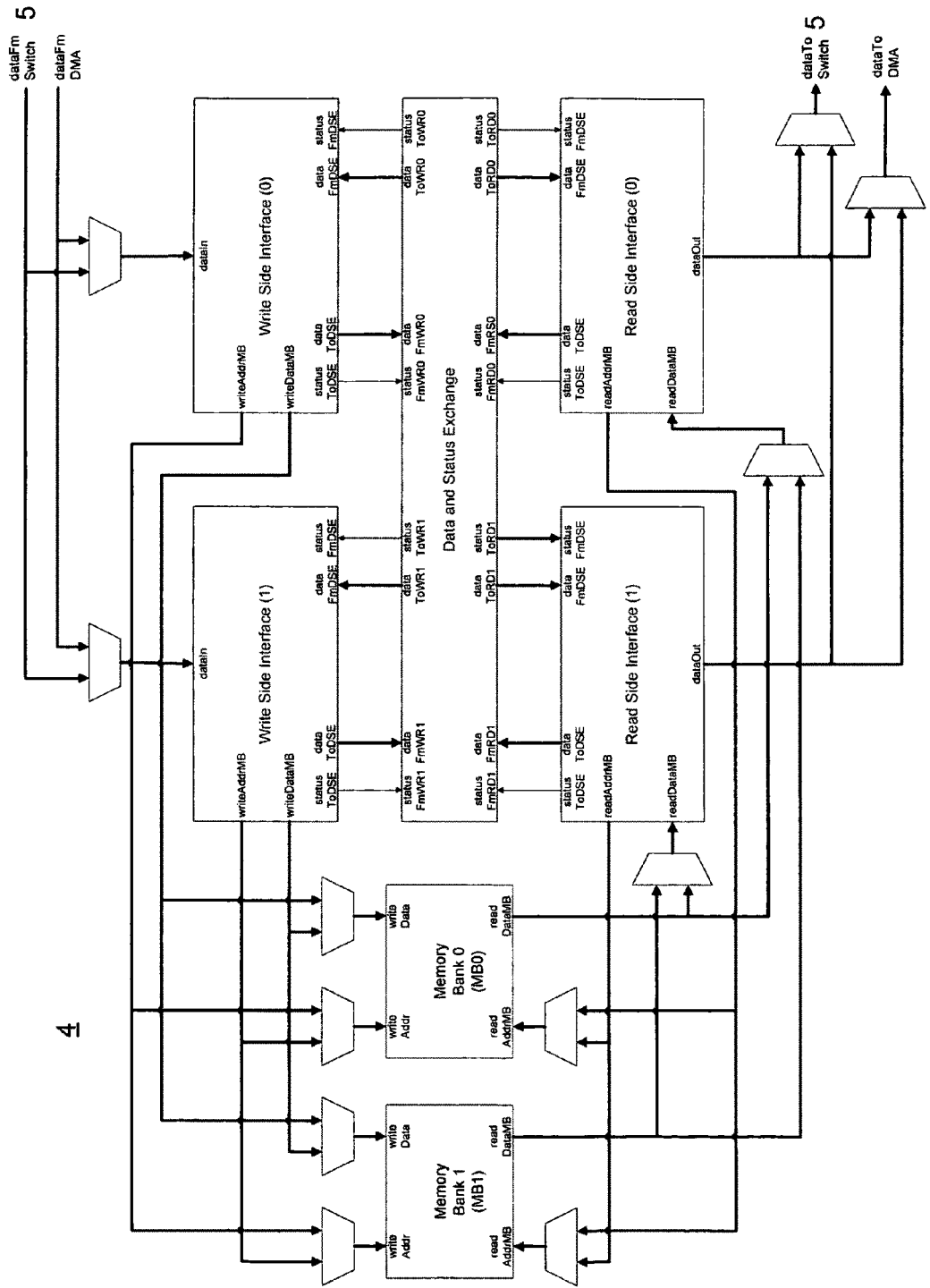
Figure 6: Memory Unit Datapath

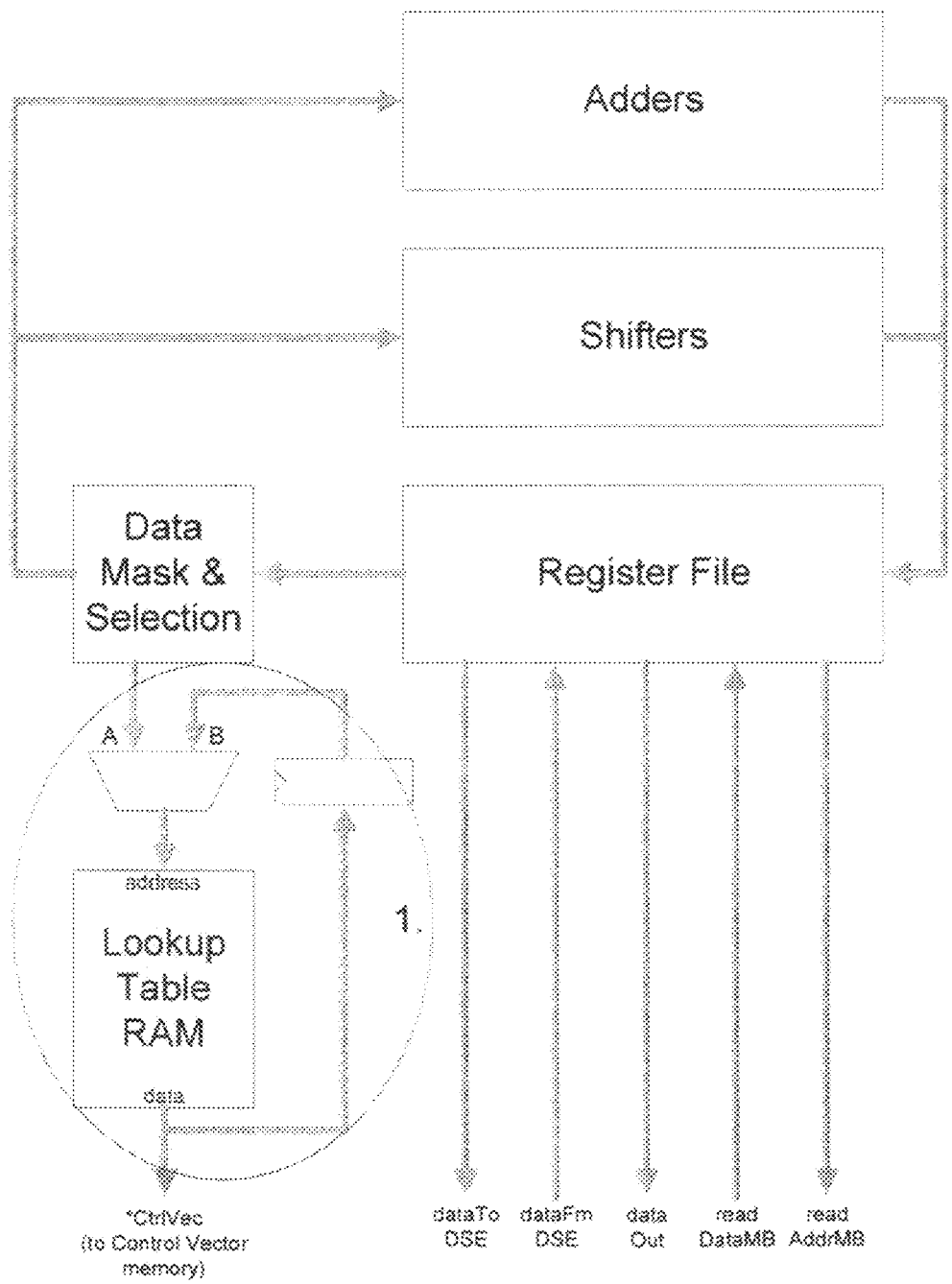
Figure 7: Read Side Interface in Memory Unit

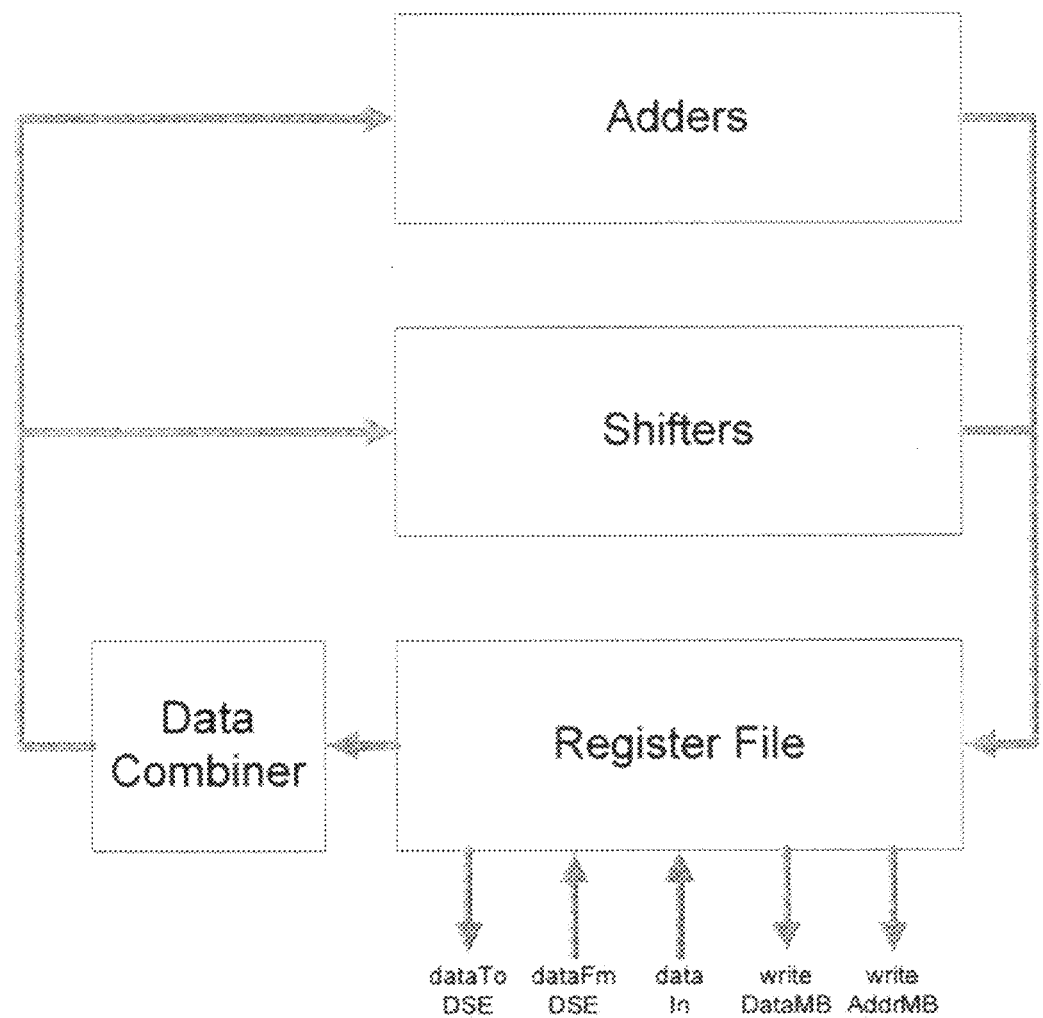
Figure 8: Write Side Interface in Memory Unit

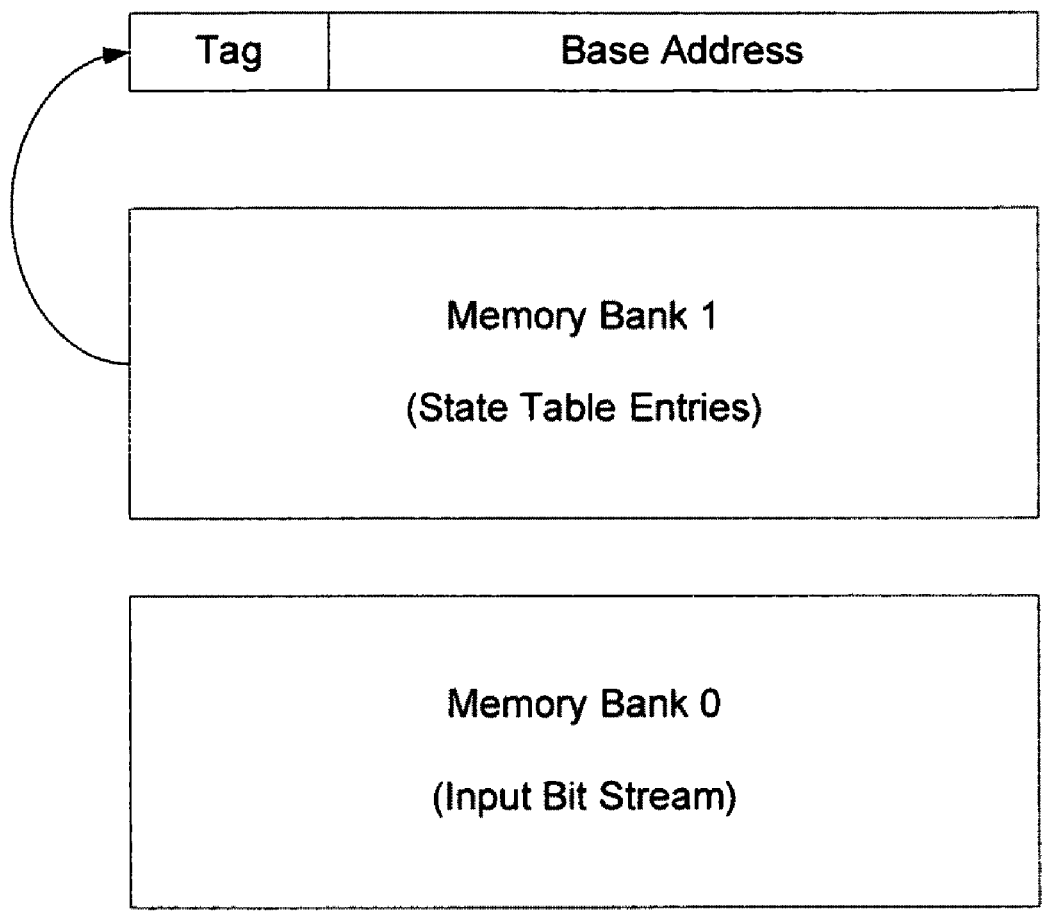
Figure 9: State Table Entry and Input Bit Stream

INSTRUCTION SET DESIGN, CONTROL AND COMMUNICATION IN PROGRAMMABLE MICROPROCESSOR CORES AND THE LIKE

FIELD

The present invention relates generally to the field of real-time data processing and microprocessor techniques therefor; being more specifically concerned with improving the control, communication, instruction set design, and data flow in programmable microprocessors and the like; and more particularly, though not exclusively, with improved memory unit design, programming method, and flow control in switch-controlled programmable processor and flexible pipeline and parallel processing, of the type described in co-pending U.S. patent application Ser. No. 11/973,184 and U.S. Publication No. US 2008/0301413, for "Method Of And Apparatus And Architecture For Real Time Signal Processing By Switch-Controlled Programmable Processor Configuring And Flexible Pipeline And Parallel Processing".

BACKGROUND OF INVENTION

As described in said copending patent application, prior art and existing processor architecture have not yet achieved powerful enough or flexible enough designs for real time universal multimedia applications, particularly in light of the growing and diverse program applications that are converging in one system, for example, single hand-held devices, such as a cellular handset.

Such existing processor architectures (e.g. MIPS, ARM, etc.) generally operate with a single instruction set; and the control information coded in such an instruction set, drives all the functional circuit blocks in a single processor core.

Typical of such functional blocks are
  sequencer that calculates the address for the next instruction fetch (e.g. +1 to fetch the instruction immediately following the current, load x for a branch, etc.). The calculation of such instruction address can be dependent on a condition flag.
  computation unit that performs various arithmetic or logic operations on incoming data, such as the execution units described in said co-pending patent application.
  register files and their configurable connection to the inputs and outputs of the computation units.
  memory bus that can be configured to send data to or receive data from specific address in external memory.

The more flexible these functional blocks can be made, the better they can be used to execute any general purpose program. On the other hand, the more flexible these functional blocks are, the more bits are required to configure them for a specific operation.

Prior architectures and their strengths and limitations will now be reviewed as a background to the strategies of the invention set design, control and communication herein used in the processor cores of the present invention.

In the traditional Von Neumann architecture, the compiled software program contains the instruction sequence to be executed as well as the data to be processed, and both are stored in memory together. The bandwidth between the memory and the CPU, however, limits the performance as it sets an upper bound on how many bits of instruction and data can be sent to the processor each clock cycle. This is the famous Von Neumann "bottleneck" identified in 1970s.

Later architecture, such as the Harvard and Super Harvard Architectures, separated the instruction and data memory; and added an instruction cache of faster internal memory inside the CPU to enable speculative loading of new pages (blocks of memory) of instruction from external memory, and swapping out old pages. The goal was to fetch the next instruction from the faster cache memory instead of the main instruction memory. A speculation algorithm is used to determine what new pages to load and what old pages to swap out. While the performance is improved for a cache "hit" (i.e. finding the instruction in the cache), when there is a cache "miss" (i.e. not finding the instruction in the cache), the processor stalls many cycles while waiting for the new page to be loaded. If the speculation algorithm is not efficient, the performance suffers. Such design also comes at a price of added hardware and complexity to handle such an efficient speculation algorithm. Some modern processor architectures also use data caches as well.

A different prior art called RISC Processor and Pipeline, as described in said co-pending patent application, works on limiting the size of the single instruction. The Reduced Instruction Set Computer (RISC) defines the instruction set in the principle of lowest common denominator of any general purpose program. The instruction set is simple or "reduced", making the hardware required to execute them, simple as well. The execution of a single instruction is then divided into pipeline stages in hardware, with equal or similar propagation delays and registers for buffering intermediate data results, and with necessary control signals passed by one stage to next. The processor then attempts to stack the execution of n instructions in parallel with the preceding instruction executing one stage ahead. When the pipeline is filled, the throughput of each instruction is 1/n of the time to complete its execution in hardware. This way, even though the instruction set is simpler and each instruction can perform limited operation, it executes much faster, as, for example, in the classic MIPS processor—a well-known 5-stage RISC. In such MIPS design, the instruction set is kept simple and the hardware is reused. For example, on ALU block is used not only for data processing but also for computing the address for data memory access, as well. A register file is used to store data pre- and post-ALU operation as well as storing part of the memory access address. This is possible because all instructions are kept relatively simple and require similar amounts of hardware processing. But even in this simple architecture, all the hardware cannot be utilized all the time. The MEM (memory access) stage, for example, is not utilized for any arithmetic or logic operation instruction.

It should be observed, moreover, that in the pipelined RISC design, all control signals for all pipeline stages are generated at the ID (Instruction decode) stage, and they have to be buffered and carried to their intended stages. Even in the simple 5-stage MIPS, there are thus still many control signals being buffered and sent along the pipeline stages.

Although, as also explained in said co-pending patent application, the RISC processor improves instruction throughput by utilizing pipelined structure, there are limitations on such attached improvements. One such is its ability to execute computation-intensive real-time signal processing programs. Without special instruction and special hardware for multiplication, or multiply-accumulation, these operations can take many cycles to execute. A 16-bit multiplication, in an example, can take up to 16 cycles; and a 32-bit multiplication can take up to 32 cycles. Such performance is not, however, adequate for real-time computation-intensive algorithms. Another limitation is the constraint on filling the pipeline. If the choice of next instruction is dependent on the computation result of the previous one (i.e. branch instruction), it cannot be fetched one cycle after the previous one is fetched at which time the result is not known. This prevents the pipeline from getting filled, which results in stalling. Instead of stalling, instruction on one path of the branch can then, however, be speculatively fetched. When the result is available, the pipeline can then proceed normally, provided the correct branch has been fetched. Otherwise, the pipeline must be flushed to go back to the right branch. Such speculative execution thus only improves efficiency if the branch prediction has a high rate of accuracy which is not always easy to achieve.

As also mentioned in said co-pending patent application, the use of DSP can significantly improve the performance of algorithms with continuous multiply-accumulate or MAC operation (e.g. filtering, matrix multiplication) because a pipelined DSP with added special instructions and dedicated hardware achieves MAC operation throughput of a single cycle.

But for non-computation-intensive programs, the added single cycle MAC logic can be a significant overhead, since such are not used for other instructions. And for algorithms that are not mostly MAC-based (e.g. motion compensation in video decode which is, rather, addition based), the MAC logic also does not improve performance.

As today's real-time multimedia processing algorithms get much more complicated, moreover, increasingly more computation hardware must be added to the processor. To keep the throughput high, a pipelined structure is still used, but with more stages in order to have a reasonable propagation delay for each stage.

With more hardware to perform more computations in parallel, moreover, more control information (i.e. instruction) and more data must enter the processor pipeline every clock cycle to make use of the hardware blocks. The original before-discussed Von Neumann bottleneck challenge is then multiplied many times, since the clock rate has become much higher. In addition, there is more instruction and data that needs to get into the processor pipeline stages every clock cycle, so techniques such as instruction and data cache, branch prediction must still be used to improve performance.

With the different computation hardware used in parallel to process data, their capability has to be mapped to the user program. As opposed to RISC, the hardware is no longer the lowest common denominator of general purpose program and the most efficient mapping is not easy to achieve. And instruction set design accordingly starts to depart from the traditional RISC principle.

A way to take advantage, however, of the multiple computation blocks executing in parallel, is to duplicate the hardware units and use the same instruction to drive multiple sets of data calculation. This is called Single Instruction Multiple Data (SIMD) and it is an efficient use of control bits; but it is only practical for algorithms that have a lot of parallel identical calculations on different data sets.

It is more complicated, however, to map parallel computation to different hardware blocks. One approach is to use Fixed Length Instruction with each instruction targeting one hardware block. A hardware instruction sequencing and dispatch block is capable of fetching and sequencing multiple instructions every clock cycle. There is an instruction decode block provided for each computation unit, such being called the Superscalar Instruction Dispatch Architecture.

Still another prior approach is to use Very Long Instruction Word (VLIW) to code for all possible combinations of parallel instruction. In this case, there only needs to be one instruction fetch module that can fetch one instruction at a time. But such a long instruction is very inefficient for simple operations (e.g. control instruction without parallel computation).

The Resulting Complexity of Processor Design

While today's processors use the above-described techniques to improve performance, all still increase the hardware complexity and power consumption. Resort has accordingly been taken to the use of one or more layers of hierarchical data and instruction memory for caching with sophisticated page replacement algorithms. This results, however, in the need for complex instruction fetch logic to figure out where to fetch the next instruction from. Multiple sets of computation block are dedicated to special computation activators, such as Multiplication, Addition and Logic Operation, Shift and Rotate—which indeed are only fully utilized in a cycle if 1) the program can be sequenced to use all blocks in parallel, and 2) there is enough bandwidth to get the required control bits to the computation block. The use of branch prediction to keep the pipeline filled, is, of course, subject to branch prediction errors which may be more costly, since the pipeline to be flushed is then deeper.

All the above processor design and prior art schemes, including added hardware and complexity, have thus not achieved a processor powerful enough and flexible enough for real-time universal multimedia application.

A review of today's multimedia mobile handsets with System On Chip (SoC) current designs, reveals the use of multiple processors, and also the supplemental uses of multiple Application Specific Integrated Circuit (ASIC) blocks in them (discussed also in said co-pending application). So also with the current high-end set-top box SoC. These multiple processors often include simple RISC for control function, traditional digital signal processing (DSP) for voice/audio processing, and VLIW multimedia processors for image and video processing, supplemented with ASIC blocks that handle algorithms that cannot be handled well by the prior programmable processors.

There is, however, a significant difference between resort to ASIC and a stand-alone programmable processor.

Today's processor has centralized instruction dispatch. All the logic blocks in the processor pipeline get their control signals sent through the pipeline from the instruction decode stage. For a coded instruction as long as 256 bits, for example, the decoded control signals can be numerous. These signals need to get to their intended block every cycle to maintain the throughput, resulting in a significant on-chip bandwidth requirement for the control signals. The instructions must also be sequenced to maximize computation hardware usage every clock cycle under the constraints of the data memory bandwidth, the size of the register file, and their possible connection to the computation unit, making efficient instruction sequencing a difficult task.

The most significant difference between ASIC and such a general purpose processor is that ASIC does not have programs or instructions. ASIC only has a data flow, and not an instruction or control flow. The input data flows through different functional blocks and buffer memory blocks towards the output. Data are processed by each functional block as they traverse through it, and without the overhead of instruction traffic, the clock rate can be kept low.

In accordance with the hereinafter detailed approach of the present invention, many of these inadequacies of existing and prior art programmable processors, with their centralized fetch and decode block strategy that determines the control for every other block in the system, every clock cycle, are successfully overcome.

In addition, there are a few popular algorithms and operations that existing and prior art general purpose processors have trouble in handling. One of them involves the implementation of Variable Length Decoder (VLD) or Huffman Decoder. In general, Huffman coding uses fewer bits to code symbols that appear more frequently (e.g. letter "e" in the English language), and more bits to code symbols that appear less frequently (e.g. letter "x" in the English language). Decoding of such symbols in a bit stream is difficult in current processors because 1. Frequent symbols are usually coded with much fewer bits than the fixed oprand bits for a processor; and
2. The location where a symbol starts depends on the processing result of the current symbol, making the next instruction dependent on computation results of current instructions all the time. No effective speculative instruction-fetch algorithm can indeed be implemented either, since the instruction-fetch is totally data dependent. This is very inefficient since it makes filling the pipeline almost impossible.

Another challenge for today's processor is the implementation of a Finite State Machine (FSM). The FSM is used to quickly derive a new state based on the previous stored state and new inputs. Output (or actions) is then derived from the new state, or new state and inputs. There are usually, however, very few bits of new inputs, and very few bits that represent the state compared to the typical oprand bit width. It is extremely difficult, therefore, to write FSM instruction sequences that can be easily pipelined in a processor for fast execution. But with limited gates and a few bits of registers, a very fast FSM can be implemented in digital ASIC. In fact, Huffman decoding of each symbol can be implemented with a few linked states with each state corresponding to a specific bit pattern that has been read and number of new bits to read to continue the decoding process.

The present invention addresses these limitations by improving the logic circuit interface to memory banks.

OBJECTS OF INVENTION

A primary object of the invention, accordingly, is to provide a new and improved flexible data processing method and apparatus, particularly suited for both general and special purpose real-time multimedia applications and for numerical program use, and that shall not be subject to the above-mentioned or hereinafter—described and other limitations and difficulties with prior art and existing processors; and, in connection with the flexible programmable embedded processor with configurable pipeline stages of said co-pending patent application, opens up the horizon for almost unlimited application software programs in their convergence into single devices such as a cellular handset, a set-top box for TV reception or other similar devices.

A further object is to provide a highly innovative multiprocessor core design and control, with novel memory organization and data path, as well as suitable read-side and write-side interfaces with the memory banks.

Other and further objects will be hereinafter pointed out, and are delineated also in the appended claims.

SUMMARY

In summary, from perhaps one of the broader viewpoints, the invention embraces a method of clock cycle synchronized flexible programmable data processing with a processor containing a plurality of different functional computation units, memory units, full access switch units for interconnecting them, and control units, that comprises, connecting different functional units to form predetermined control paths and data pipelines in a hierarchical manner;

using a common instruction set to program all functional units wherein the instruction set directly codes instruction sequencing (i.e. method for calculating address for next instruction fetch) and directly or indirectly codes hardware controls;

setting up distributed program sequencing with each functional unit having its own program counter, instruction fetch and decode units and its own local memory for program storage;

generating control vectors that control the datapath of such functional units, every clock cycle; and configuring multiple memory units to operate in different memory access modes and connecting them to functional computation units through said switch unit to maximize programmability.

Preferred and best mode design details are later presented.

DRAWINGS

The invention will now be described with reference to the accompanying drawings, FIG. 1 of which is a block diagram illustrating the invention with its distributed program sequencing and de-coupled instruction data flow;

FIG. 6 is a combined circuit and block diagram that can be programmed with the lookup table of FIG. 7;

FIG. 8 is a diagram of the write-side interface useful with the invention; and

FIG. 9 illustrates the memory units operating as a finite state machine wherein two read-side interfaces are used in synchronization to read state table entries in one memory bank, and the input bid stream in the other.

DESCRIPTION OF PREFERRED EMBODIMENTS OF PRESENT INVENTION

Figure 1:
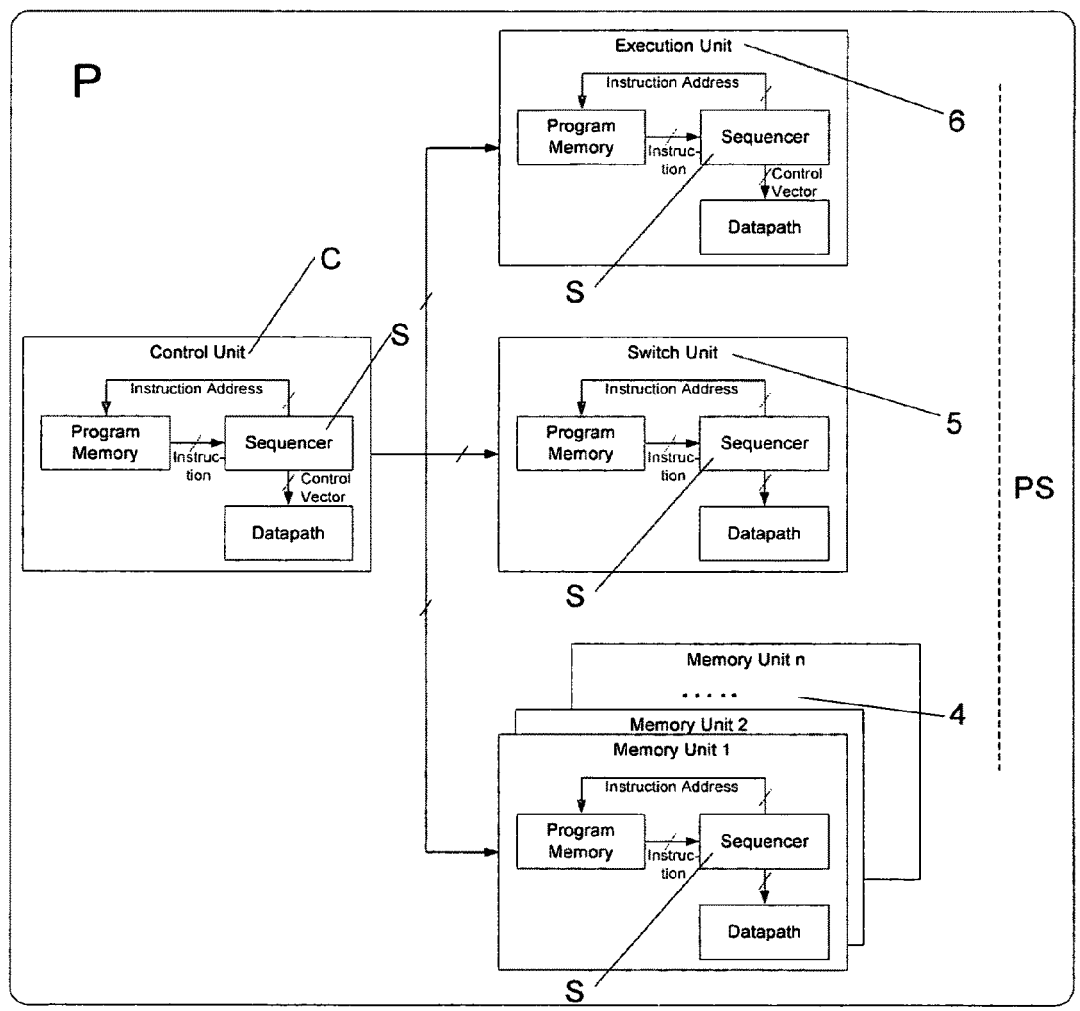

As before explained, in present-day processor designs, the instruction fetch and instruction decode stages are the central nerve system of the whole processor, and the efficiency of the entire processor is dependent on the translation of incoming instructions every clock cycle to control signals to drive all the hardware in the pipelines stages to perform useful work. This has to be done, moreover, with all the hardware, software and bandwidth constraints described above.

Underlying the present invention and its embodiments herein described is a very different strategy of doing away with the centralized fetch and decode block that determines the control for every other block in the system every clock cycle. The present approach, rather, is to set up natural data flow for batch data processing similar to that in an ASIC, but still to maintain the benefit of programmability. The following items summarize the strategy and approach of the invention.

Table 1

1. Adoption of distributed program sequencing as opposed to centralized program sequencing, with each functional block in the processor having its own program counter, instruction fetch and decode block, and each functional block having its own local memory for program storage.
2. Using a generic instruction set common to all functional units for programming each functional unit wherein the instruction set directly codes instruction sequencing (i.e. method for calculating address for next instruction fetch) and directly or indirectly codes hardware controls.
3. Controlling the functional blocks in a hierarchical manner by connecting different functional blocks together to form a control hierarchy and data pipeline.
4. Making the computation blocks flexible to fit more types of data flow and operations, such that they can perform more steps of arithmetic and logic operations on incoming data without intermediary buffering in memory, or reducing traffic to and from data memory, as taught in said co-pending patent application.
5. Connecting multiple memory blocks and associated logic with computation blocks through a full-access switch in order to maximize programmability, as in said co-pending patent application.
6. Adding logic to the memory read/write circuitry to handle data-dependent processing, tree or graph traversal, as a finite state machine later described herein.

The reasoning behind the strategy of the present invention to adopt distributed program sequencing (item "1" above) firstly resides in the fact that with the processor divided into different functional blocks, each focused on performing specific operations (e.g. Execution Unit for data computation, Memory Unit for retrieving data and write back data with specific addressing mode), there is less hardware to control for each block. The total number of different operation modes required for each block in a user program or a subroutine, is limited. The control lines for an entire user program or at least several subroutines, furthermore, can be stored in a reasonable amount of local program and control vector memory. This approach, moreover, decouples instruction flow from data flow. Multiple sets of data can repeatedly use the same instruction sequence in a functional unit, to be properly processed in that block. Such control information, additionally, does not need to traverse the data pipeline, saving buffering resources and on-chip bandwidth.

The rationale for separating the sequencing of the instruction and control of the datapath (item "2", above) is a simplification thereof while providing flexibility in the size and definition of the control vectors for diverse hardware blocks in the datapath. The same instruction set, however, can be used for diverse hardware blocks.

As for item "3", above, with hierarchical controls, program and instruction, flows can be managed at different levels with different types of data and control exchange requirements.

Referring to the functional blocks instruction sequencing diagram of FIG. 1, the invention thus provides a flexible programming method, control mechanism and processor architecture in which the hardware resource in the processor P, preferably of pipelined architecture PS, is divided into functional blocks (e.g. Execution Units 6, Memory Units 4, and Switch Unit 5), for example, as described in said co-pending application. Each functional block has its own local program memory, labeled "program memory", a sequencer, so-labeled, to fetch the instruction from the program memory, and to decode the instruction and to generate control vectors that will control the functionality of the hardware in the datapath, every clock cycle, as more completely shown in FIG. 2.

Figure 2:
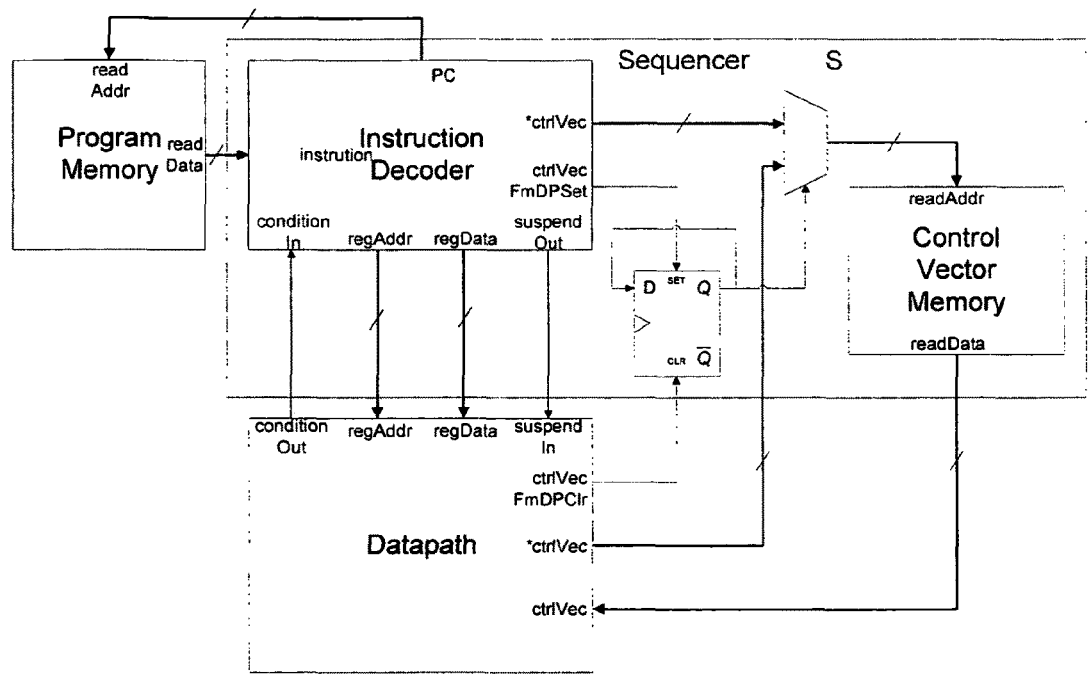
FIG. 2 is a similar diagram showing a preferred sequencer for each functional unit of FIG. 1.

An illustrative instruction set and corresponding sequencer design for the invention as generalized in FIGS. 1 and 2 that codes the method to calculate the next instruction address (conditional branch, jump, etc.), and three exemplary general purpose operation modes of the datapath explicitly, and enables all other types of operations of the datapath indirectly. Such an instruction set design allows the same instruction set to program diverse hardware blocks that require different numbers of bits for coding their respective control vectors. The calculation of the next instruction address depends on current instruction coding and a condition signal that is connected to the instruction sequencer, as in FIG. 2.

There are two indirect methods to configure the datapath;
a. An instruction includes an address pointer used to look up the control vector for next clock cycle in a dedicated memory space inside the sequencer. The content of the control vector line determines the following three aspect of the datapath in a clock cycle—
   i. The interconnection between different parts of the datapath to construct the portion of the data pipeline within the datapath
   ii. The specific arithmetic and logic operations performed by the datapath
   iii. The selection of the conditional signal to pass to the instruction sequencer
b. An instruction that includes a field that specifies either register address or register content, such that multiple instructions of this type can be used to update registers in the datapath.

In preferred operation, the following three operations are coded explicitly:
a. Suspend the datapath operation such that registers in the datapath will not be updated with new values if the condition signal is true.
b. Clear the suspension.
c. Set the control vector addressing mode to datapath update mode, FIG. 2, such that the datapath is responsible for generating the pointer used to look up its own control vector for the next clock cycle in a dedicated memory space inside the sequencers. (The datapath is responsible for clearing this mode.)

The organization of the functional blocks of FIGS. 1 and 2 is such that they can be organized as a parent block C (processor control circuit) and subsidiary or "child" blocks 4, 5, 6, etc. for control purposes.

The parent block control unit C initializes bulk transfer of programs (usually through DMA) and control vectors into their assigned memory space in the subsidiary or child blocks.

Figure 3:
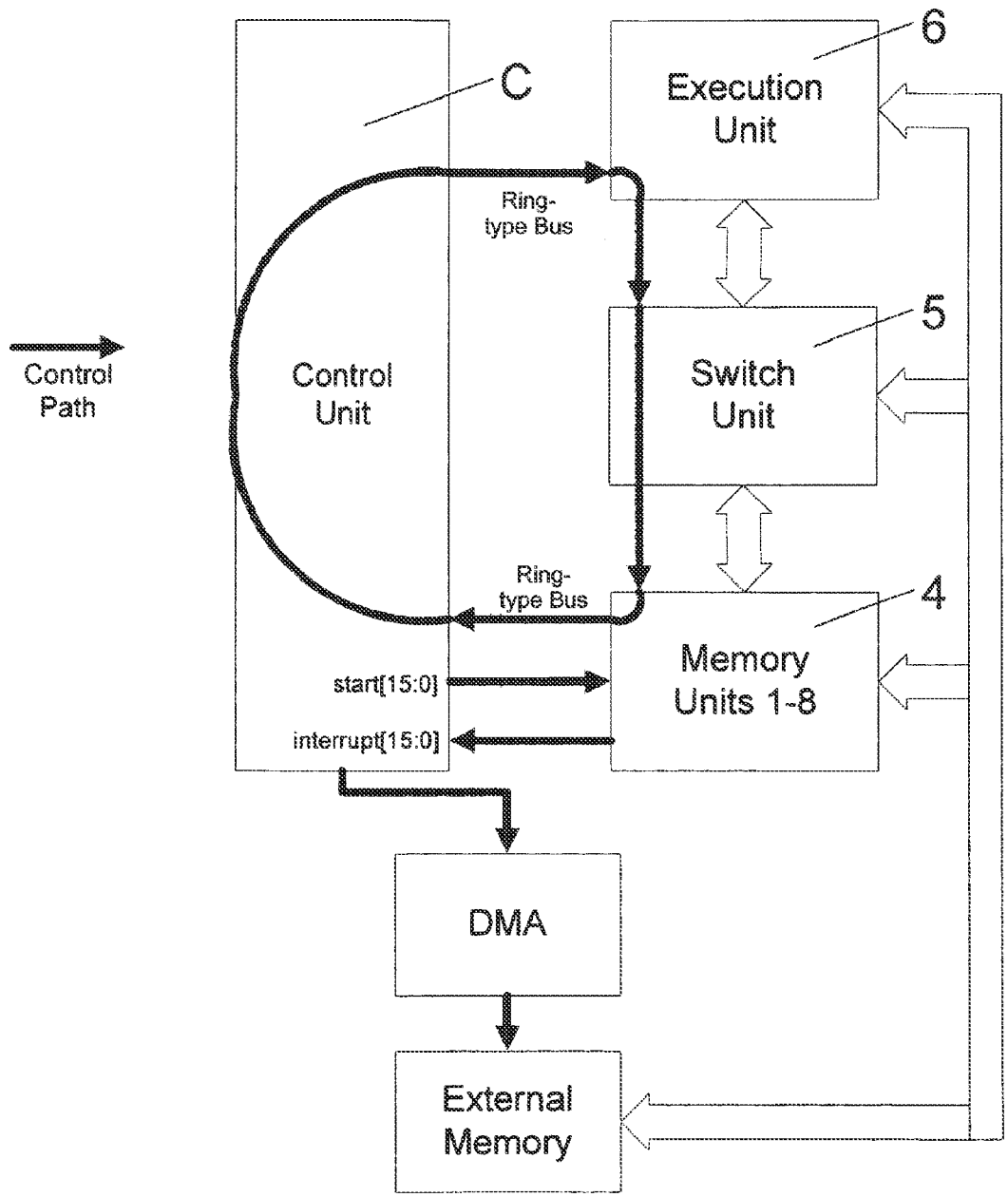
FIG. 3 shows the useful control organization employing a preferred ring-type bus.

The invention uses, in preferred implementation, a ring-type bus, FIG. 3, that starts and ends at the parent block, and that passes through each of its subsidiary blocks. This ring-type bus is used to pass messages between the control unit parent block and all of its subsidiary blocks 4, 5, 6, etc. through a general purpose register and memory read/write protocol. For example, it can be used by the control block C to set the program counter register to point to the beginning of the next module of the program to be executed in subsidiary blocks.

If desired, an optional set of start signals from the parent control block C to subsidiary blocks may also be used to control the exact clock cycles that execution of certain program modules begin; and an optional set of interrupt signals from subsidiary blocks back to the parent block may also be provided to request attention from the parent control block. For example, the subsidiary block can raise the signal to indicate that it has completed the execution of a program module.

Figure 4:
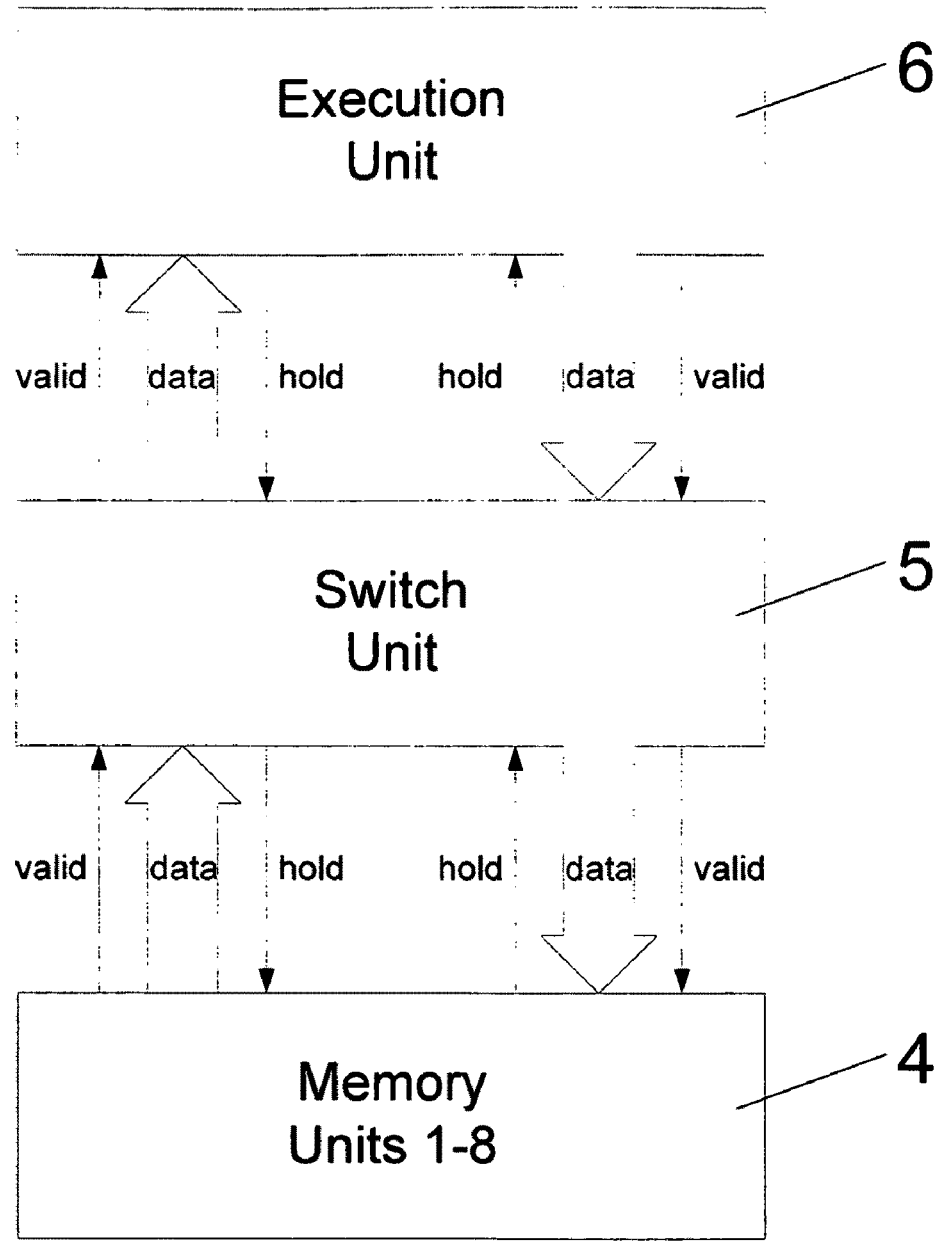
FIG. 4 is a suitable supplier-consumer organizational configuration for the data pipeline.

The organization of the functional blocks along the data pipeline for control purpose in a supplier and consumer relationship, is illustrated in FIG. 4.

There is a "valid" signal from the supplier to the consumer to indicate that the data sent from the consumer to the supplier is valid and thus the processing in the consumer can start.

There is a "hold" signal from the consumer to the supplier to indicate that the consumer cannot accept new data. The supplier will then suspend its operation and hold register values in its datapath until the hold signal is cleared, at which point it will resume operation. The "valid" and "hold" signals can either be set up by the control vectors directly or by logic circuits in the datapath.

For the present invention, the method of mapping a target data processing program to instruction sequences for the above-mentioned processor design of the invention, involves the following steps:

a. Divide the entire data processing program into different data processing modules. Each module can be handled by a data pipeline constructed with single or multiple functional blocks in the processor as before described. Different data processing modules can be executed in the processor either at different time slots or on separate blocks of hardware with proper connections in between.

b. Each data pipeline that corresponds to a single processing module is constructed with single or multiple instruction sequences, one for each of the functional blocks along the data pipeline.

i. The instruction sequence starts with a spin wait for a start or valid signal. The instruction sequence ends with an interrupt or a message write to its parent block.

ii. The instruction sequence usually includes a loop, the loop count of which indicates number of sets of data to traverse the portion of the data pipeline inside the functional block according to the instruction sequence inside the loop. (i.e. batch processing)

iii. The instruction sequence enables the proper set up of the "valid" and "hold" signal as described in FIG. 4.

c. Control of the progression from one processing module to the next in time slots is achieved through an instruction sequence in the parent or control block C for all the functional blocks used to construct all the data pipelines.

For each data processing module— i. The instruction sequence ensures that the functional blocks used for the data processing module are at the appropriate state to begin execution.

ii. The instruction sequence sends start signals to the functional blocks at the beginning of the data pipeline. (usually the Memory Units.)

iii. While the data pipeline for the current processing module is running, the instruction sequence initiates the bulk loading and unloading of program (i.e. instruction sequences and control vectors) and data into and from their corresponding memory spaces to get ready for the next processing module (assuming hardware availability and necessity).

[Note 1: For certain user programs, all instruction sequences for the entire program can fit in the distributed program memory spaces, so that they can be loaded at boot-up time.

Note 2: For data processing that operates on the result of a previous module, the data can just stay in place without being unloaded.

Note 3: This type of cache reloading, moreover, is deterministic, not speculative.]

iv. The instruction sequence waits for an interrupt or message from the functional block that is at the end of the pipeline. (again, usually the Memory Units.)

Turning from the improvement aspects provided by the invention for programmable processors in general, the preferred memory unit architecture for the flexible processor of said co-pending patent application and the present invention will now be considered.

The Improved Memory Unit Organization, Architecture and Data Flow Of The Invention In the preferred Memory Unit design, suitable for the programmable pipeline architecture of said co-pending patent application common hardware, structures are used to assist the fast execution of software algorithms and operations. The preferred processor design of the invention includes multiple Memory Units that can be programmed either to operate as independent data memory storage for different and independent computation blocks, or to operate in synchronization to provide for unified data memory storage with appropriate addressing modes (e.g. two-dimensional addressing, rotate addressing, etc.) for the interconnected computation blocks. The organization of the memory units inside the programmable processor for the current invention is shown in FIG. 5 and the datapath of a single memory unit in FIG. 6.

Figure 5:
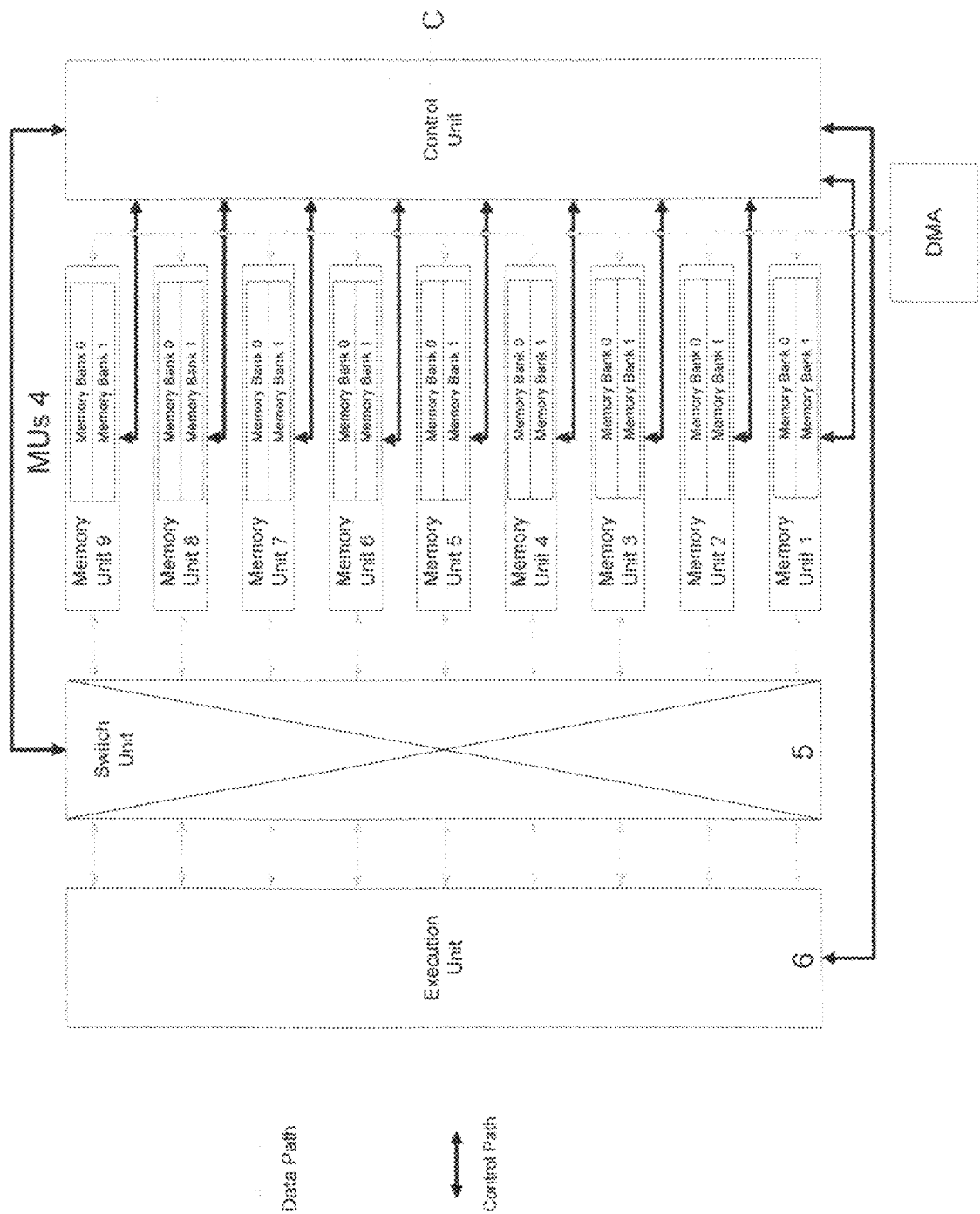
FIG. 5 is a diagram of a preferred memory unit organization including two dual ported memory banks and two read-side and two write-side interfaces.

In FIG. 5, the datapth of a Memory Unit is shown including two dual-ported memory banks (labeled as "Bank 0" and "Bank 1") in FIGS. 5 and 6, two Read Side Interfaces, two Write Side Interfaces, and a Data and Status Exchange (DSE) as labeled in FIG. 6. The two Read Side Interfaces have different functionality. The two Write Side Interfaces also have different functionality. The connections of which Write Side Interface to which memory bank, as well as which Read Side Interface to which memory bank, are programmable. The hardware allows the set up of hierarchical data pipelines. At the upper hierarchical layer, the DSE sets up data and status exchange between read interfaces and write interfaces of the two memory banks. At the lower hierarchical layer, each read interface or write interface sets up specific data pipeline for specific processing within the interface unit.

The invention allows synchronized reads, synchronized writes, or synchronized read and write within the same memory banks or between two memory banks for different operations.

The invention also enables the sending and receiving of data from the Switch Unit 5 to the appropriate memory banks as part of the data pipeline operation, and at the same time sending and receiving data from the DMA to the appropriate memory banks for bulk transfer of data to external memory. (In practice, this is intended to operate with the before-mentioned deterministic cache load and unload, to get ready for the next task or program module).

The Read Side Interface of FIG. 6 consists of an ALU, a data mask and selection block, and a small random access memory (RAM) that can be programmed with a lookup table, so-labeled in FIG. 7. The data mask and selection block can mask out certain bits in a data word or select sub-word in a data word to pass on. The RAM can be programmed with a lookup table in which an input address can be used to retrieve one line of content that is an address pointer for addressing the control vector memory for this functional unit. The RAM can be configured to accept address input from different sources (e.g. part of data being processed or status in the datapath).

The Write Side Interface of FIG. 6 is shown in FIG. 8 consisting of an ALU and a data combiner block. The data combiner can merge two sub-words from two data words to form a new data word.

The Read Side Interface and the Write Side Interface enable different modes of address computation for memory read and write. They also enable the processing of read data after a read operation and processing of write data before a write operation.

In addition, they provide the hardware required, in accordance with the invention, to program the Memory Unit to operate as a Finite State Machine (FSM). Such machine may, for example, be of the form of the known Mealy Machine or Moore Machine. In such operation, a. the two memory banks are used in each Memory Unit to hold the state table entries in one, and input bit streams in the other as in FIG. 9.
b. Each state table entry consists of two fields—
  i. The tag field TG which will be used to index a control vector corresponding to this state through the lookup table programmed in the RAM; and
  ii. The base address field BA, used in combination with the input stream to calculate the read address of next state entry.
c. The two Read Side Interfaces are used in synchronization to read state table entries in one memory bank, and the input bit stream in another. The input bit stream is sent to the Read Side Interface responsible for reading the state table entries and is buffered in its register file.
d. The control vector addressing mode for the Memory Unit is set to datapath update mode, allowing the datapath to select its own control vector for the next cycle.
e. For each state entry read, the data mask and select block will decompose the table entry to the two fields TG and BA.
f. The tag TG indexes a control vector through a lookup table programmed in the RAM (shown as 1 in FIG. 7). The control vector configures the datapath to
  i. Retrieve the appropriate number of bits from the input stream
  ii. Calculate read address for next state entry based on BA field and the input bits retrieved
  iii. Take actions or produce output for the current state
g. If it takes multiple clock cycles to complete the three operations described in f, the lookup table 1 of FIG. 7 can be configured to accept address input from the register that buffers its own output (B in FIG. 7) by the control vector that TG indexes. The lookup table can then be used to index a few control vectors until the last control vector configures the lookup table to accept the address from the output of the data mask and selection block again (A in FIG. 7).

Further modifications will occur to those skilled in this art, and such are considered to fall within the spirit and scope of the present invention, as delineated in the appended claims.

What is claimed is:

1. A method of clock cycle synchronized flexible programmable execution of a data processing program, the method comprising:
  providing a processor containing a plurality of functional units, each functional unit being a computation unit, memory unit, full access switch unit for interconnecting execution units with memory units, or a control unit, each functional unit having its own program counter, its own instruction fetch and decode unit, and its own dedicated local program memory for storing instructions that control the functional unit during program execution;
  dividing the data processing program into one or more data processing modules;
  connecting different functional units to form predetermined control paths and data pipelines in a hierarchical manner;
  using a common instruction set to program at least some of the functional units, wherein the instruction set directly codes instruction sequencing and directly or indirectly codes hardware controls;
  setting up distributed program sequencing in the dedicated local program memories of each of the programmed functional units, the dedicated local program memory in each programmed functional unit being loaded before execution of each processing module with all instructions required during execution of that processing module;
  generating control vectors that control the control paths and data pipelines of said functional units every clock cycle;
  configuring multiple memory units to operate in different memory access modes and connecting them to the computation units through said switch units to maximize programmability; and
  executing the processing modules.

2. The method of claim 1 wherein each of the data processing modules is handled by a data pipeline constructed with one or more of said functional units in the processor, and with each data pipeline constructed with single or multiple clock cycle synchronized instruction sequences, one for each of the functional units along the data pipeline.

3. The method of claim 2 wherein different data processing modules can be mapped as follows: (a) onto different hardware blocks with connections between the blocks used for progression from one module to a next module, (b) different data processing modules mapped onto a same hardware block with execution of modules multiplexed onto different time slots in order of module progression, and (c) a combination of both (a) and (b).

4. The method of claim 3 wherein control and synchronization of progression from one data processing module to the next in time slots, is achieved through an instruction sequence in a parent control unit for all the functional units used to construct the data pipeline.

5. The method of claim 1 wherein hardware of the processor is dynamically organized into one or more data pipelines.

6. The method of claim 5 wherein each data pipeline employs a hierarchical structure with data flow first established between different parent units and then established between subsidiary units of a parent unit such that the entire data pipeline is constructed one level after another.

7. The method of claim 1 wherein the functional units in the processor are dynamically organized into a control hierarchy in which a parent control unit is provided that only exchanges control and synchronization messages and signals with corresponding subsidiary units.

8. The method of claim 7 wherein a ring-type bus, is employed between the processor parent control unit and the functional units it controls including execution units, switch units and memory units.

9. The method of claim 1 wherein data processing can be performed by parallel execution of instruction sequences in heterogeneous hardware blocks.

10. The method of claim 1 wherein the functional units are flexibly arranged to enable different types of data flow and arithmetic and logic operation sequences in a data pipeline to eliminate buffering in memory and to reduce traffic to and from data memory.

11. The method of claim 1 wherein the common instruction set is used to program diverse functional hardware blocks requiring different numbers of bits for their respective control coding.

12. The method of claim 11 wherein the instruction set employs an instruction format that allows direct coding of instruction sequencing, direct coding of a subset of the hardware controls, and indirect coding of hardware controls through either an address pointer to a control vector memory or a register read and write command.

13. The method of claim 12 wherein the hardware controls coded in an instruction specify an organization of and interconnection between sub blocks within a block to form a specific hardware construct.

14. The method of claim 1 wherein a memory unit includes two dual-ported memory banks each of which can alternate between being part of a data pipeline construct and interfacing with external memory for bulk loading and unloading of data.

15. The method of claim 14 wherein each of two memory banks is programmed by instruction to connect to either of two read side interfaces with different functionality and either of two write side interfaces with different functionality.

16. The method of claim 15 wherein each of the four interfaces comprises an arithmetic unit that supports a set of functionalities specific to each interface and other elements to enable different modes of memory address calculation or simple data processing.

17. The method of claim 15 wherein each memory unit is used to construct a hierarchical data pipeline that comprises,
programming a DSE for data and status exchange amongst the two read side interfaces and two write side interfaces supporting the two memory banks for necessary coordination and timing alignment amongst the four interfaces; and
programming each of the four interfaces to establish a data pipeline within an interface wherein the arithmetic unit can be used for simple data processing before data are written to a memory bank or after data are read from a memory bank.

18. The method of claim 1 wherein a finite state machine is implemented using one memory bank in said memory unit to hold state table entries, and an instruction sequence for the memory unit to operate on input data bit streams in another memory bank to traverse from one state entry to the next.

19. A clock-cycle synchronized flexible programmable data processor comprising:
a plurality of different functional units, each functional unit being a computation unit, a memory unit, a full access switch unit for interconnecting computation units with memory units, or a control unit each functional unit having its own program counter, its own instruction fetch and decode unit, and its own dedicated local program memory for storing all instructions required for controlling the functional unit during execution of a processing module, the functional units being interconnectable to form predetermined control paths and data pipelines in a hierarchical manner;
a common instruction set for programming the functional units, wherein the instruction set directly codes instruction sequencing and directly or indirectly codes hardware controls;
means for generating control vectors that control the control paths and data pipelines of said functional units every clock cycle; and
means for configuring multiple memory units to operate in different memory access modes and means for connecting them to computation units through said switch unit to maximize programmability.

20. The processor of claim 19 wherein a data processing program is generated in which the data processing program is divided into different data processing modules, each handled by a data pipeline constructed with one or more said functional units in the processor, and with each data pipeline constructed with single or multiple clock cycle synchronized instruction sequences, one for each of the functional units along the data pipeline.

21. The processor of claim 20 wherein different data processing modules can be mapped onto different hardware blocks with connections between the blocks used for progression from one module to a next module.

22. The processor of claim 20 wherein different data processing modules are mapped onto a same hardware block with execution of modules multiplexed onto different time slots in order of module progression.

23. The processor of claim 21 or 22 wherein control and synchronization of progression from one data processing module to the next in time slots, is achieved through an instruction sequence in the parent control unit for all the functional units used to construct the data pipeline.

24. The processor of claim 19 wherein hardware of the processor is dynamically organized into one or more data pipelines.

25. The processor of claim 24 wherein each data pipeline employs a hierarchical structure with data flow first established between different parent units and then established between subsidiary units of a parent unit such that the data pipeline is constructed one level after another.

26. The processor of claim 19 wherein the functional units in the processor are dynamically organized into a control hierarchy in which each parent control unit only exchanges control and synchronization messages and signals with its subsidiary units.

27. The processor of claim 19 wherein data processing is performed by parallel execution of instruction sequences in heterogeneous hardware blocks.

28. The processor of claim 19 wherein the functional units are flexibly arranged to enable different types of data flow and arithmetic and logic operation sequences in a data pipeline to eliminate buffering in memory and to reduce traffic to and from data memory.

29. The processor of claim 19 wherein the common instruction set is used to program diverse functional hardware blocks requiring different numbers of bits for their respective control coding.

30. The processor of claim 29 wherein the common instruction set employs an instruction format that allows direct coding of instruction sequencing, direct coding of a subset of the hardware controls, and indirect coding of hardware controls through one of an address pointer to a control vector memory or a register read and write command.

31. The processor of claim 30 wherein the hardware control coded in an instruction specifies the organization of and interconnection between sub blocks within a block to form a specific hardware construct.

32. The processor of claim 19 wherein a memory unit includes two dual-ported memory banks which can alternate between being part of a data pipeline construct and interfacing with external memory for bulk loading and unloading of data.

33. The processor of claim 32 wherein each of two memory banks can be programmed by instruction to connect to either of two read side interfaces with different functionality and either of two write side interfaces with different functionality.

34. The processor of claim 33 wherein each of the four interfaces comprises an arithmetic unit that supports a set of functionalities specific to each interface and other elements to enable different modes of memory address calculation or simple data processing.

35. The processor of claim 19 wherein each memory unit is used to construct a hierarchical data pipeline that comprises, means for programming a DSE for data and status exchange amongst two read side interfaces and two write side interfaces supporting two memory banks for necessary coordination and timing alignment amongst their interfaces; and means for programming each of the interfaces to establish a data pipeline within an interface where the arithmetic unit can be used for simple data processing before data are written to a memory bank or after data are read from a memory bank.

36. The processor of claim 19 wherein a finite state machine is implemented using one memory bank in a memory unit to hold state table entries, and an instruction sequence for the memory unit to operate on input data bit streams in another memory bank to traverse from one state entry to the next.

37. The processor of claim 19 wherein a ring-type bus is employed between a processor parent control unit and the functional units it controls including execution units, switch units and memory units.

38. The processor of claim 19, wherein a plurality of the memory units are organizationally programmed either to operate as independent data memory storage units for corresponding different and independent functional blocks, or to operate in synchronization to provide a unified memory storage with appropriate two-dimensional addressing and rotate addressing modes with interconnected functional blocks.

39. The processor of claim 38 wherein the memory units and the functional blocks are matrix-switch inter-connectable.

* * * * *